United States Patent [19]

Baumann et al.

[11] Patent Number: 5,310,766
[45] Date of Patent: May 10, 1994

[54] FOAM STABILIZING ADDITIVE AND POLYURETHANE FOAM PREPARED IN THE PRESENCE THEREOF

[75] Inventors: Robert Baumann, Adliswil; Rajinder Sood, Wollerau, both of Switzerland

[73] Assignee: The Dow Chemical Company, Midland, Mich.

[21] Appl. No.: 898,616

[22] Filed: Jun. 15, 1992

[51] Int. Cl.$^5$ ............................ C08J 9/08; C08K 5/01
[52] U.S. Cl. ................................... 521/130; 521/117; 521/132; 521/163; 521/170; 521/172; 521/173; 521/174; 521/176
[58] Field of Search ............... 521/117, 130, 163, 170, 521/172, 173, 174, 176, 132

[56] References Cited

U.S. PATENT DOCUMENTS

| | | | |
|---|---|---|---|
| 3,846,355 | 11/1974 | Mayer | 528/55 |
| 3,923,926 | 12/1975 | Harada et al. | 528/66 |
| 3,957,753 | 5/1976 | Hostettler et al. | 521/172 |
| 4,264,743 | 4/1981 | Maruyama et al. | 521/173 |
| 4,302,551 | 11/1981 | Horn et al. | 521/163 |
| 4,798,851 | 1/1989 | Werner et al. | 521/172 |
| 4,801,623 | 1/1989 | Hess et al. | 521/157 |
| 5,104,904 | 4/1992 | Glynn et al. | 521/172 |

FOREIGN PATENT DOCUMENTS

| | | | |
|---|---|---|---|
| 0129858 | 6/1984 | European Pat. Off. | |
| 923643 | 4/1963 | United Kingdom | 521/132 |
| 1085037 | 9/1967 | United Kingdom | 521/132 |
| 1455706 | 12/1973 | United Kingdom | |

Primary Examiner—John Kight, III
Assistant Examiner—Rabon Sergent

[57] ABSTRACT

This invention relates to a polyurethane foam stabilizing additive that comprises from about 10 to about 50 weight percent a hydrocarbon oil, and in from about 90 to about 50 weight percent a polyester polyol which is a solid at room temperature. Use of the additive in a polyurethane foaming process provides for improved dimensional stability of the resulting foam. The additive is especially of value when preparing water blown polyether polyol-based polyurethane foam useful, for example, in sealant applications.

16 Claims, No Drawings

5,310,766

FOAM STABILIZING ADDITIVE AND POLYURETHANE FOAM PREPARED IN THE PRESENCE THEREOF

This invention relates to water-blown polyurethane foam prepared in the presence of a foam stabilizing additive that comprises a hydrocarbon oil and a polyester polyol which is a solid at room temperature.

BACKGROUND OF THE INVENTION

Coating, adhesive and sealing compositions which are to be applied to vertical or non-horizontal surfaces desirably have certain limited flow properties. Advantageously, such compositions should remain essentially in the area to which they have been applied until they have had sufficient time to harden and acquire there final shape. This is especially important for compositions which contain one or more liquid components or reactants. Exemplary of such are polyurethane sealant foam compositions comprising a liquid polyisocyanate and a liquid polyahl component. The polyisocyanate and polyahl should be sufficiently mobile to permit their intimate mixing and yet once mixed the reacting mass should not be so mobile that it can flow away from the region to which it has just been applied. To this end, a thixotropic agent is usually present in the composition. A thixotropic agent is a substance which can impart to a composition a liquid state when such composition is shaken or stirred and a gel like state to the composition when not physically agitated.

Frequently employed thixotropic agents include finely divided particles or solids such as fumed silica, polyurethane scrap powder or organic polymers such as polyureas obtainable from aliphatic or aromatic polyamines and aliphatic or aromatic polyisocyanates. French patent 2,447,955 discloses a multipurpose thixotropic mastic coating composition containing volcanic slag, polyurethane scrap powder and a polyester resin. Japanese patent 57-195,765 discloses thixotropic polyurethane compositions obtainable by mixing an isocyanate-terminated prepolymer with an aromatic carboxylic acid ester in the presence of carbon black. U.S. Pat. No. 4,438,235 discloses the use of tertiary alkanolamines as thickening additive for polyols having a molecular weight of from 100 to 2000. Japanese patent 63-015876 discloses a urethane sealant composition which comprises an isocyanate-terminated prepolymer, thixotropic fatty acids, filler and plasticizer. U.S. Pat. No. 4,801,623 discloses the preparation of a thixotropic agent for storage stable polyurethane systems from a uretdione group-containing polyisocyanate with a polyfunctional carboxylic acid and a high molecular weight alcohol. Other patent publications describing the use of thixotropic or thickening agents for polyurethanes include U.S. Pat. Nos. 5,023,309; 3,923,926; 4,945,128; J02-167365; J01-014269 and EP-129,858.

The above-mentioned thixotropic systems and thickening additives in general fulfill the requirements of permitting the preparation of polyurethane foam at a non-horizontal application area. However in many instances the resulting foam is observed to have an inadequate dimensional stability with often severe foam shrinkage occurring in a relatively short period of time. This problem can be particularly acute when the physical blowing agent normally present in the foaming process is partially or totally replaced by water. Use of water is considered highly desirable in view of current opinions over the stability of the atmospheric ozone layer and the alleged association of certain per(chlorofluoro)carbons with its depletion. An additional undesirable feature observed when attempting to prepare such water blown polyurethane foam is that the dimensional stability of the resulting foam is influenced by the time for which the polyahl/thixotropic agent composition has been stored prior to foaming. Extended storage times are observed to frequently result in foam with inferior dimensional stability.

It would be therefore desirable to develop an alternative additive for use when preparing polyurethane foam, especially rigid polyurethane foam on a non horizontal surface, which can permit the use of significant amounts of water in a foaming process and provide for foam which has an enhanced dimensional stability. It would be also to advantage if such additive, when formulated with the polyahl component, could allow for an extended storage period of the resulting composition with a minimum detriment to the dimensional stability characteristics of the foam eventually prepared therefrom.

SUMMARY OF THE INVENTION

It is now found that a combination of a hydrocarbon oil and a polyester polyol as an additive is able to adequately minimize the above mentioned deficiencies when preparing polyurethane foam.

In a first aspect, this invention relates to a process for preparing a rigid polyurethane foam by reacting an organic polyisocyanate with a liquid polyahl in the presence of water and a foam stabilizing additive characterized in that the additive is present in an amount of up to about 10 parts by weight per 100 parts liquid polyahl and comprises:

(a) from about 10 to about 50 weight percent, based on total weight of (a) and (b), of a hydrocarbon oil; and (b) from about 90 to about 50 weight percent, based on total weight of (a) and (b), of a polyester polyol which is a solid at room temperature.

In a second aspect, this invention relates to a polyurethane foam prepared according to the above process.

In a third aspect, this invention relates to a two component polyurethane foam forming system, for use in the above process, which comprises:

(a) an organic polyisocyanate; and (b) an isocyanate-reactive composition containing a liquid polyahl and from about 2 to about 10 parts per 100 parts by weight of the polyahl, a foam stabilizing additive which contains:

(i) from 10 to about 50 weight percent, based on total weight of (i) and (ii), of a hydrocarbon oil; and (ii) from about 90 to 50 weight percent, based on total weight of (i) and (ii), of a polyester polyol which is a solid at room temperature.

In a fourth aspect, this invention relates to an isocyanate-reactive composition containing a liquid polyahl and from about 2 to about 10 parts per 100 parts by weight of the polyahl, a foam stabilizing additive which comprises:

(a) from 10 to about 50 weight percent, based on total weight of (a) and (b), of a hydrocarbon oil; and (b) from about 90 to 50 weight percent, based on total weight of (a) and (b), of a polyester polyol which is a solid at room temperature.

Foam obtained in accordance with this invention displays an enhanced dimensional stability in comparison to similar foam prepared in the absence of the above described additive but in the presence of, for example fumed silica, a conventional thixotropic additive. Additionally, this invention permits the manufacture of polyurethane foam suitable for, for example, sealant and adhesive applications having an enhanced dimensional stability from a liquid polyahl, formulated with the foam stabilizing additive, which has been stored for an extended period of time.

DETAILED DESCRIPTION OF THE INVENTION

The foam stabilizing additive composition comprises in from about 10 to about 50 weight percent a hydrocarbon oil, and in from about 90 to about 50 weight percent a polyester polyol which is substantially a solid at room temperature. Preferably the hydrocarbon oil is present in an amount of from about 10 to about 40, and more preferably from about 15 to about 30 weight percent based on total weight of the composition. Preferably the polyester polyol is present in an amount of from about 90 to about 60, and more preferably from about 85 to about 70 weight percent based on total weight of the composition.

The hydrocarbon oils which are useful in this invention are those oils which are of low viscosity, essentially non-reactive under the foaming conditions and susceptible to forming emulsions with the polyurethane foam-forming reactants and especially the liquid polyahl. Generally such oils are of a paraffinic or olefinic nature and have a low aromatic content. Such hydrocarbons are typically high boiling point petroleum fractions such as mineral oils, fuel oils, kerosenes and conventional lubricating oils having a boiling point at atmospheric pressure above about 150° C. Specific examples of suitable hydrocarbon oils include mineral oils, fuel oils Nos. 2, 3, 4 and 5, diesel oil, naphthenic process oils and the like. Exemplary of, and preferred, suitable hydrocarbon oils are liquid paraffin products such as commercially available under the trademark ONDINA from Shell and include ONDINA Oil 15, ONDINA Oil 32 and ONDINA Oil 68. Such oils are described as having an average molecular weight in the range of from about 300 to about 500: a pour point temperature of from about $-40°$ to about $-15°$ C.;

The polyester polyols which are useful in this invention are those which are a solid at room temperature and have a melting point above room temperature. Advantageously the polyester polyol has a melting point within the range of from about 50° C. to about 115° C., and preferably from about 55° C. to about 100° C. Typically such polyester polyol has an average molecular weight of from about 2000 to about 6000, preferably from about 2500, and more preferably from about 3000 and preferably up to about 5000, more preferably up to about 4500. Suitable polyester polyols may be, for instance, produced from dicarboxylic acids, preferably aliphatic dicarboxylic acids, having 2 to 12 carbon atoms in the alkylene radical, and multifunctional alcohols, preferably diols. These acids include, for instance, aliphatic dicarboxylic acids such as glutaric acid, pimelic acid, suberic acid, azelaic acid, sebacic acid, undecanedioic acid, dodecanedioic acid, and preferably, succinic and adipic acids: cycloaliphatic dicarboxylic acids such as 1,3- and 1,4-cyclohexane dicarboxylic acid: and aromatic dioarboxylic acids such as phthalic acid and terephthalic acid. Examples of di- and multifunctional, particularly difunctional, alcohols are: ethylene glycol, diethylene glycol, propylene glycol, dipropylene glycol, 1,3-propanediol, 1,10-decanediol, glycerine, trimethylolpropane, and preferably, 1,4-butanediol, and 1,6-hexanediol. Particularly preferred polyester polyols for use in this invention are those obtained from adipic acid and hexane diol due to their solid nature at room temperature.

The above described foam stabilizing additive may be prepared by intimately mixing the hydrocarbon oil with the polyester polyol and subsequently introducing the so obtained mixture directly into the polyurethane foam forming process. However such a mixture can be difficult to prepare and the resulting mixture, an emulsion, does not have attractive storage stability characteristics and should be used almost immediately. Accordingly it is preferred to prepare the additive by an in situ procedure which comprises adding to a liquid polyahl, the hydrocarbon oil and polyester polyol constituents of the additive, thereby obtaining an isocyanate-reactive composition which comprises the additive and subsequently using this composition to prepare the polyurethane foam. In any event, the amount of foam stabilizing additive present, in the process of preparing the polyurethane foam or present in the isocyanate-reactive composition from which the foam is manufactured, is an amount of up to about 10 parts per 100 parts by weight of the liquid polyahl present. The additive is preferably present in an amount of from about 1, more preferably from about 2, and preferably up to about 8, more preferably up to about 7 parts per 100 parts by weight of the liquid polyahl. When the additive is present in amounts greater than this, the composition in the form of an emulsion may not be stable. Use of too little amount of the additive may not provide for sufficient limitation of the flow characteristics of such system permitting application to non-horizontal surfaces.

Liquid polyahls suitable for preparing an isocyanate reactive composition containing the above mentioned additive and for reacting with polyisocyanate to obtain a polyurethane foam are those substances containing isocyanate-reactive hydrogen atoms and include polyamines, polyesters and polyether polyols. Polyether polyols are preferred due to their better processability in systems containing water. Generally, the preferred polyether polyols are those used in the manufacture if rigid polyurethane foam. Typically, such polyether polyols include those which have have an average hydroxyl equivalent weight of from about 50 to about 700, preferably from about 70, more preferably from about 90, and preferably up to about 500, more preferably up to about 400. Further, such polyether polyols will generally contain from about 2 to about 8, preferably from about 3 to about 8, and more preferably from about 3 to about 6 hydroxyl moieties per molecule. Examples of suitable polyether polyols are described more fully in U.S. Pat. No. 4,394,491 incorporated herein by reference. Exemplary of such polyether polyols include those commercially available under the trademark, VORANOL such as VORANOL 100, VORANOL 202, VORANOL 360, VORANOL 370, VORANOL 446, VORANOL 490, VORANOL 575, VORANOL 800 VORANOL CP450, VORANOL CP700, VORANOL CP1000 all sold by The Dow Chemical Company. Other preferred polyols include alkylene oxide derivatives of Mannich condensates as taught in, for example, U.S. Pat. Nos. 3,297,597; 4,137,265 and 4,383,102 all incorporated herein by reference; and amino-alkylpiperazine-initiated polyether polyols as described in U.S. Pat. Nos. 4,704,410 and 4,704,411 also incorporated herein by reference.

Polyisocyanates suitable for use in this invention include aliphatic and cycloaliphatic and especially aromatic polyisocyanates and combinations thereof. Representative of these types are diisocyanates such as m- or p-phenylene diisocyanate, toluene-2,4-diisocyanate, toluene-2,6-diisocyanate, hexamethylene-1,6-diisocyanate, tetramethylene-1,4-diisocyanate, cyclohexane-1,4-diisocyanate, hexahydrotoluene diisocyanate (and isomers), naphthylene-1,5-diisocyanate, 1-methylphenyl-2,4-phenyldiisocyanate, diphenylmethane-4,4'-diisocyanate, diphenylmethane-2,4'-diisocyanate, 4,4'-biphenylene diisocyanate, 3,3'-dimethoxy-4,4'-diphenylenediisocyanate and 3,3'-dimethyldiphenylpropane-4,4'-diisocyanate: triisocyanates such as toluene-2,4,6-triisocyanate and polyisocyanates such as 4,4'-dimethyldiphenylmethane-2,2',5',5'-tetraisocyanate and the diverse polymethylene polyphenyl polyisocyanates. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine. The preferred undistilled or crude polyisocyanates are disclosed in U.S. Pat. No. 3,215,652, incorporated herein by reference. Especially preferred are methylene-bridged polyphenyl polyisocyanates and mixtures thereof with crude diphenylmethane diisocyanate, due to their ability to cross-link the polyurethane.

The amount of polyisocyanate present when preparing the polyurethane foam is such to provide from about 0.7 to about 1.5 isocyanate groups per isocyanate reactive atom present in the polyahl(s), water and polyester component of the additive constituents of the foaming process. Preferably the amount of isocyanate is such to provide from about 0.8, more preferably from about 0.95, and preferably up to about 1.4, more preferably up to about 1.3 isocyanate groups per isocyanate reactive atom.

When preparing polyurethane foam, water is the preferred blowing agent. Water reacts with the polyisocyanate leading to the generation of nascent carbon dioxide which functions as a blowing agent causing the reacting polyisocyanate - liquid polyahl mass to acquire a reduced density. Water is present in an amount sufficient to provide for the majority, that is at least 50, preferably at least 70, more preferably at least 85 and up to 100 mole percent of the blowing requirement to obtain a polyurethane foam which has a density of from about 20 to about 100 kilograms per cubic meter. Preferably the resulting foam has a density of from about 25, more preferably from about 30 and preferably up to about 80 more preferably up to about 60 kilograms per cubic meter. Typically the amount of water required for this purpose is from about 1 to about 10 parts per 100 parts by weight of liquid polyahl. The water is present preferably in an amount of from about 2, more preferably from about 3.5, and preferably up to about 8, more preferably up to about 6 parts per 100 parts by weight of liquid polyahl.

In a highly preferred embodiment of this invention, water provides for the entirety of the blowing capacity to give foam of the above mentioned density. When the entirety of the blowing capacity is not provided for by water, a supplemental blowing agent precursor besides water and/or a physical blowing agent, such as for example a low boiling point alkane or a halogen-containing substance, may be present. However for environmental reasons it is particularly preferred that the process of preparing the foam is substantially free of any such halogen-containing blowing agent.

If present, such physical blowing agents include (per)fluorocarbons and the hydrogen-containing chlorofluorocarbon compounds. Such substances are well known in the art of preparing polyurethane foam and are frequently referred to as "Refrigerants". The term "Refrigerant" in association with a given number is a nomenclature of common general knowledge widely used in the domain of Chemistry and Chemical Engineering and very specifically identifies certain chemical compounds including halocarbons. Further details are provide in for example, American Society of Heating, Refrigerating, and Air Conditioning Engineers (Atlanta, Ga.) ASHRAE Standard 34-78 where the method of coding such substances is explained and exemplified. Exemplary suitable physical blowing agents include Refrigerant 21, Refrigerant 22, Refrigerant 123, Refrigerant 123a, Refrigerant 124, Refrigerant 124a, Refrigerant 133 (all isomers), Refrigerant 134 and 134a, Refrigerant 141b, Refrigerant 142, Refrigerant 151. Among these, Refrigerant 123 (all isomers), Refrigerant 134 and 134a, Refrigerant 141b and Refrigerant 142 (all isomers) are most preferred for reasons of commercial availability and for their low ozone depletion potential. Supplemental blowing agent precursor substances include the amine/carbon dioxide complexes such as taught in U.S. Pat. Nos. 4,735,970 and 4,500,656: incorporated herein by reference. If used, care should be exercised in the amount of physical blowing agent present. Use of amounts to provide for more than 50, preferably more than 30 mole percent of the blowing requirement is undesirable as this can solubilize the solid polyester polyol.

Optionally, but advantageously other ingredients present in the process of preparing the polyurethane foam include catalysts, surfactants, flame retardants include phosphorus containing substances such as tris(chloroalkyl)phosphate and triethylphosphate, and nitrogen containing substances such as melamine, colorants, antioxidants, reinforcing agents, fillers, antistatic agents and the like. When present, useful fillers include substances such as fumed silica. It is desirable that such fumed silica be incorporated into the polyurethane foam by way of the polyisocyanate, as opposed to the isocyanate reactive composition containing the foam stabilizing additive. Such isocyanate-reactive compositions when containing fumed silica are frequently observed to exhibit poor storage stability especially where the fumed silica has a hydrophilic nature. If the presence of fumed silica is required within the isocyanate-reactive composition advantageously, to provide for system stability, it should be a hydrophobic fumed silica.

One or more catalysts for the reaction of the active hydrogen-containing compound with the polyisocyanate are advantageously present. Any suitable urethane catalyst may be used, including tertiary amine compounds and organometallic compounds. Exemplary tertiary amine compounds include triethylenediamine, N-methylmorpholine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N',N'-dimethyl isopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408 incorporated herein by reference. A catalyst for the trimerization of polyisocyanates and formation of polyisocyanurate polymers, such as an alkali metal alkoxide, alkali metal carboxylate, or quatenary amine compound, may also optionally be employed herein. When employed, the quantity of catalyst used is sufficient to increase the rate of polymerization reaction. Precise quantities must be determined experimentally, but generally will range from about 0.001 to about 3.0 parts by weight per 100 parts liquid polyahl depending on the type and activity of the catalyst.

It is generally highly preferred to employ a minor amount of a surfactant to help control the growth and retention of the cell structure of the foam at least up to the point until it is sufficiently cured not to be susceptible to collapse. Such surfactants advantageously comprise a an organosilicone surfactant. Other, less preferred surfactants, include polyethylene glycol ethers of long chain alcohols, tertiary amine or alkanolamine salts of long chain alkyl acid sulfate esters, alkyl sulfonate esters and alkyl arylsulfonic acids. Such surfactants are employed in amounts sufficient to stabilize the foaming reaction mixture against collapse and the formation of large, uneven cells. Typically, from about 0.2 to about 5 parts of the surfactant per 100 parts by weight liquid polyahl are sufficient for this purpose.

In the process of making a polyurethane foam, the polyahl(s), polyisocyanate and other components are contacted, thoroughly mixed and permitted to expand and cure into a cellular polymer. The particulate mixing apparatus is not critical, and various types of mixing head and spray apparatus are conveniently used. It is often convenient, but not necessary, to preblend certain of the raw materials prior to reacting the polyisocyanate and polyol components. For example, it is often useful to blend the polyol(s), blowing agent, surfactants, catalysts and other components except for polyisocyanates, and then contact this mixture with the polyisocyanate. Alternatively, all components can be introduced individually to the mixing zone where the polyisocyanate and polyol(s) are contacted. It is also possible to pre-react all or a portion of the polyol(s) with the polyisocyanate to form a prepolymer.

As mentioned, one aspect of the present invention relates a polyurethane foam forming system containing two separately distinct components. As first component, a polyisocyanate as already herein described, and as second component an isocyanate reactive composition containing an above described liquid polyahl and foam stabilizing additive in the prescribed amount. The polyisocyanate component is typically present in from about 70 to about 150 parts by weight and the isocyanate reactive composition typically in from about 80 to about 140 parts by weight.

Polyurethane foam obtained according to the present invention in the presence of the mentioned foam stabilizing additive is particularly of value as a sealant or insulation foam in, for example, the construction industry to seal window and door frames. However use of this invention is not restricted to such application and has value when it is desired to apply polyurethane to any surface but especially vertical or non-horizontal surfaces. The invention is illustrated by way of the following examples given hereinbelow. Such examples are not to be considered as limiting the scope of the invention. Unless otherwise indicated all amounts given are parts by weight.

EXAMPLE 1

Polyurethane foam is prepared according to the formulations given in Table 1. The foam is prepared by placing a cartridge containing the isocyanate component and a second cartridge containing the isocyanate-reactive composition including stabilizing additive in to a hand driven pressing gun. The two components are passed through a static mixer and allowed to react resulting in a rigid polyurethane foam with a tack-free time of about 3 minutes.

The formulation components given in Table 1 are identified as follows:

Voranol TM CP 1055: oxypropylene adduct of glycerine of about 1000 molecular weight available from The Dow Chemical Company:

Voranol TM RN 411: oxypropylene adduct of glycerine/sucrose of about 410 hydroxyl number, average functionality about 4.5, available from The Dow Chemical Company:

Voranol TM RA 640: oxypropylene adduct of ethylene diamine, hydroxyl number about 640, available from The Dow Chemical Company:

DMCHA: dimethylcyclohexylamine;

DMDEE: (2,2'-dimorpholino-diethyl-ether;

Tegostab TM B8002: Silicone surfactant available from Th. Goldschmidt AG:

Tegostab TM B1048: Silicone surfactant available from Th. Goldschmidt AG:

TCPP: Tris(betachloro-propyl)phosphate

Aerosil TM 200: a hydrophilic fumed silica available from Degussa;

Aerosil TM R202: a hydrophobic fumed silica fumed silica available from Degussa:

Dynacoll TM 7360: Poly-hexamethylene-adipate polyol; molecular weight 3500, melting point 60° C. available from Hüls AG:

PARAFFIN OIL ONDINA Oil 68 available from Shell:

VORANATE TM M229 a crude polymethylene polyphenylpolyisocyanate with an isocyanate content of about 31.5% (wt) available from The Dow Chemical Company.

In order to measure the shrinkage of the foam, the cavity between two parallel opposed particle boards of surface, 20 cm × 20 cm, and spaced apart by 25 mm was filled with the foaming mixture. The shrinkage of this 'sandwich' unit was recorded as a function of time: 1 hour, 1 day and 7 days after preparation. The test is conducted in duplicate with foam prepared between "dry" and "wet" set of particle board. The "wet" particle board is prepared by immersing particle board in water for 20 seconds, removing the board from the water and standing vertically for two minutes permitting any surface water to run off. To observe the influence, on foam dimensional stability, of storage time of a polyether polyol/foam stabilizing additive mixture prior to preparing the foam, mixtures are prepared and stored at 40° C. for 7, 14 and 21 days prior to the use thereof to prepare polyurethane foam between both "dry" and "wet" particle board.

The actual shrinkage data of foam obtained is presented in the Table 2.

TABLE 1

| Formulation No. (parts by weight) | 1 | 2 | A* | B* | C* |
|---|---|---|---|---|---|
| Polyol Component | | | | | |
| Foam Stabilizing Additive | 1.6 | 1.6 | 1.6 | 1.6 | / |
| paraffin oil/(%) | (19) | (24) | | | |
| Dynacoll 7360/(%) | 6.8 (81) | 5.0 (76) | / | / | 6.8 |
| Voranol CP 1055 | 50.4 | 50.4 | 50.4 | 50.4 | 50.4 |
| Voranol RN 411 | 27.8 | 27.8 | 27.8 | 27.8 | 27.8 |
| Voranol RA 640 | 21.8 | 21.8 | 21.8 | 21.8 | 21.8 |
| DMCHA | 1.4 | 1.4 | 1.4 | 1.4 | 1.4 |
| DMDEE | 1.4 | 1.4 | 1.4 | 1.4 | 1.4 |
| Tegostab B 8002 | 0.4 | 0.4 | 0.4 | 0.4 | 0.4 |
| Tegostab B 1048 | 1.6 | 1.6 | 1.6 | 1.6 | 1.6 |
| TCPP | 24.3 | 24.3 | 24.3 | 24.3 | 24.3 |
| Water | 4.0 | 4.0 | 4.0 | 4.0 | 4.0 |
| Aerosil 200 | / | / | 3.4 | / | / |
| Aerosil R202 | / | / | / | 4.1 | / |
| Isocyanate Component | | | | | |
| Voranate M2229 | 97.0 | 97.0 | 97.0 | 97.0 | 97.0 |
| Tegostab B8002 | 0.5 | 0.5 | 0.5 | 0.5 | 0.5 |
| Aerosil 200 | 2.5 | 2.5 | 2.5 | 2.5 | 2.5 |
| Index | 117 | 106 | 114 | 115 | 116 |
| Free rise density [kg/m$^3$] | 40.1 | 39.8 | 37.8 | 35.7 | 37.3 |

*Not an example of this invention

TABLE 2

| | Dimensional stability of resulting foams | | | | | | | | | |
|---|---|---|---|---|---|---|---|---|---|---|
| Storage period of polyol component prior to preparing the polyurethane foam // | Foam 1 | | Foam 2 | | Foam A* | | Foam B* | | Foam C* | |
| Foam storage period prior to observing dimensional stability | Dry Board | Wet Board | Dry Board | Wet Board | Dry Board | Wet Board | Dry Board | Wet Board | Dry Board | Wet Board |
| 0 day // 1 hour | 0.4% | 1.0% | 1.0 | 2.0 | 0.7 | 0.8 | 1.0% | 4.0% | 1.2% | 2.0% |
| 0 day // 1 day | 3.2 | 4.0 | 2.4 | 6.0 | 4.4 | 9.6 | 12.0 | 20.0 | 8.0 | 12.0 |
| 0 day // 7 days | n.o. | n.o. | 2.6 | 6.0 | 24.0 | 28.0 | 36.0 | 44.0 | 28.0 | 32.0 |
| 7 days at 40° C. // 1 hour | 0.4 | 1.0 | n.o. | n.o. | f.c. | f.c. | 1.0 | 2.0 | 4.0 | 1.2 |
| 7 days at 40° C. // 1 day | 2.0 | 2.0 | n.o. | n.o. | f.c. | f.c. | 4.0 | 12.0 | 8.0 | 8.0 |
| 7 days at 40° C. // 7 days | 4.0 | 4.0 | n.o. | n.o. | f.c. | f.c. | 20.0 | 20.0 | 36.0 | 44.0 |
| 14 day at 40° C. // 1 hour | 0.4 | 1.0 | n.o. | n.o. | f.c. | f.c. | 1.0 | 1.0 | 4.0 | 4.0 |
| 14 day at 40° C. // 1 day | 1.6 | 1.6 | n.o. | n.o. | f.c. | f.c. | 8.0 | 16.0 | 8.0 | 20.0 |
| 14 day at 40° C. // 7 days | 4.0 | 4.0 | n.o. | n.o. | f.c. | f.c. | 24.0 | 24.0 | 40.0 | 48.0 |
| 21 day at 40° C. // 1 hour | 0.4 | 1.0 | n.o. | n.o. | f.c. | f.c. | 1.0 | 4.0 | 1.2 | 3.0 |
| 21 day at 40° C. // 1 day | 1.2 | 1.2 | n.o. | n.o. | f.c. | f.c. | 8.0 | 16.0 | 8.0 | 8.0 |
| 21 day at 40° C. // 7 days | 4.0 | 4.0 | n.o. | n.o. | f.c. | f.c. | 20.0 | 28.0 | 32.0 | 32.0 | n.o. not observed. f.c. foam collapsed
The dimensional stability is reported as percentage shrinkage of the foam which when initially prepared had a thickness of 25 millimeters. A smaller value signifies less shrinkage and dimensional loss relative to that of the freshly prepared foam.

Formulation A shows a significant loss of reactivity and gives Foam A, which collapsed after storage of one week. It is currently considered that the water present in the formulation detrimentally interacts with the with hydrophilic fumed silica, Aerosil 200. Modifying Formulation A by using hydrophobic fumed silica, Aerosil R202 as shown in Formulation B, increases the time for which it is possible to store the polyol component prior to preparing the foam and obtain a foam, Foam B, with a reduced tendency to shrink. However overall performance is still poor, with especially a significant amount of foam shrinkage being observed where the foam has been prepared from a polyol component stored for an extended period of time.

Replacing the thixotropic additive, silica with the polyester polyol which is a solid at room temperature, Dynacoll 7360, as described in Formulation 1, gives Foam 1. Foam 1 is observed to have a significantly improved dimensional stability with time. Further no significant loss in the dimensional stability of the foam is observed when storage time of the polyol component prior to foaming is considered. Considering Foam 1 in light of Comparative Foam C clearly shows that use of the solid polyester polyol on its own is unable to confer acceptable dimensional stability to the foam, and that acceptable dimensional stability may be obtained when using a combination of paraffin oil and solid polyester polyol. It is also to be noted that the present invention provides for a significantly enhanced foam dimensional stability when such foam is prepared between both "dry" and especially "wet" particle board.

Liquid polyahl compositions containing only paraffin oil and not solid polyester polyol have not been screened. Such compositions have a viscosity which is too low to permit acceptable mixing and processing with the higher viscosity polyisocyanate when using a static mixing unit.

What is claimed is:

1. A process for preparing a rigid polyurethane foam by reacting an organic polyisocyanate with a polyahl, which is a liquid at room temperature, in the presence of a blowing agent and a foam stabilizing additive characterized in that the additive, present in an amount of from about 1 to about 10 parts by weight per 100 parts liquid polyahl, comprises, based on total weight of (a) and (b):
   (a) from about 10 to about 50 weight percent of a hydrocarbon oil; and
   (b) from about 90 to about 50 weight percent of a polyester polyol which has a melting point of from about 50° C. to about 115° C., and
wherein the blowing agent consists essentially of water present in from about 3.5 to about 10 parts by weight per 100 parts of liquid polyahl.

2. The process of claim 1 wherein the additive comprises the hydrocarbon oil in from about 10 to about 40 weight percent and the polyester polyol in from about 90 to 60 weight percent.

3. The process of claim 1 wherein the polyester polyol has a molecular weight of from about 2000 to about 6000.

4. The process of claim 3 wherein the additive is present in from about 2 to 8 parts and comprises
   (a) from 15 to 30 weight percent of a hydrocarbon oil; and (b) from 85 to 70 weight percent of a polyester polyol.

5. The process of claim 4 wherein the organic polyisocyanate is a crude methylene diphenylisocyanate or a polymethylene polyphenyl polyisocyanate.

6. The process of claim 5 wherein the liquid polyahl comprises one or more polyether polyols which has an average hydroxyl equivalent weight of from about 50 to about 700.

7. The process of claim 1 wherein the polyester polyol is obtained from adipic acid and hexane diol.

8. A polyurethane foam prepared according to process of claim 1.

9. The process of claim 1 wherein the resulting foam has a density of from about 20 to about 100 kg/m$^3$.

10. The process of claim 9 wherein the polyisocyanate is a polymethylene polyphenyl polyisocyanate, the liquid polyahl is a polyether polyol which has an average hydroxyl equivalent weight of from about 70 to about 500, the water is present in from about 3.5 to about 8 parts and the additive is present in from about 3 to about 8 parts, and wherein the polyisocyanate is present in an amount such to provide from about 0.7 to about 1.5 isocyanate groups per isocyanate reactive atom as present from the polyol and water.

11. The process of claim 10 which is substantially free of a physical blowing agent.

12. A polyurethane foam prepared according to the process of claim 11.

13. A two component polyurethane foam-forming system which comprises:
(a) an organic polyisocyanate; and
(b) an isocyanate reactive composition containing a polyahl which is a liquid at room temperature, water present in from about 3.5 to about 10 parts per 100 parts by weight of liquid polyahl, from about 1 to about 10 parts per 100 parts by weight of liquid polyahl of a foam stabilizing additive that, based on total weight of (i) and (ii), contains:
(i) from 10 to about 50 weight percent of a hydrocarbon oil; and
(ii) from about 90 to 50 weight percent of a polyester polyol which has a melting point of from about 50° C. to about 115° C.

14. In a process for preparing a rigid polyurethane foam by reacting a polyisocyanate with a liquid polyahl which is a polyether polyol or polyamine in the presence of water the improvement comprising the presence of from about 2 to about 10 parts per 100 parts by weight of liquid polyahl of a foam stabilizing additive which consists, based on total weight of (a) and (b), of:
(a) from 10 to about 50 weight percent of a hydrocarbon oil; and
(b) from about 90 to 50 weight percent of a polyester polyol which has a melting point of from about 50° C. to about 115° C.

wherein the resulting foam exhibits enhanced dimensional stability.

15. A process for preparing a rigid polyurethane foam by reacting a methylene-bridged polyphenyl polyisocyanate with one or more polyether polyols which has an average hydroxyl equivalent weight of from about 50 to about 700 in the presence of a blowing agent and a foam stabilizing additive characterized in that the additive, present in an amount of from about 1 to about 10 parts by weight per 100 parts of polyether polyol, comprises:
(a) from about 10 to about 50 weight percent, based on total weight of (a) and (b), of a hydrocarbon oil; and
(b) from about 90 to about 50 weight percent, based on total weight of (a) and (b), of a polyester polyol which has a melting point of from about 50° C. to about 115° C., and wherein the blowing agent, which is substantially free of a halogen-containing substance, consists essentially of water present in from about 3.5 to about 10 parts by weight per 100 parts of polyether polyol.

16. The process of claim 15 wherein the polyester polyol has a molecular weight of from about 2000 to about 6000 and is obtained from adipic acid and hexane diol.

* * * * *